United States Patent [19]
Blodee

[11] Patent Number: 6,102,166
[45] Date of Patent: Aug. 15, 2000

[54] WHEELCHAIR BRAKE

[76] Inventor: Leif Blodee, 19 Viburnum Ct., Homosassa, Fla. 34446

[21] Appl. No.: 09/161,818
[22] Filed: Sep. 28, 1998
[51] Int. Cl.$^7$ ....................................................... B60T 1/00
[52] U.S. Cl. ............................................................. 188/2 F
[58] Field of Search ........................ 188/2 F, 19, 20, 188/21, 22, 23; 280/250.1

[56] References Cited

U.S. PATENT DOCUMENTS

| | | | |
|---|---|---|---|
| 2,782,870 | 2/1957 | Sill | 188/2 F |
| 2,859,837 | 11/1958 | Mize | 188/2 F |
| 3,556,260 | 1/1971 | Meyer | 188/2 F |
| 4,101,143 | 7/1978 | Sieber | 280/42 |
| 4,350,227 | 9/1982 | Knoche | 188/2 |
| 4,506,901 | 3/1985 | Tosti | 188/2 F |
| 4,560,033 | 12/1985 | DeWoody et al. | 188/2 |
| 4,570,756 | 2/1986 | Minnebraker et al. | 188/2 |
| 4,589,525 | 5/1986 | Phipps et al. | 188/2 |
| 4,691,933 | 9/1987 | Strauss | 280/289 |
| 4,749,064 | 6/1988 | Jinno et al. | 188/2 |
| 4,852,697 | 8/1989 | Kulik | 188/2 F |
| 4,887,830 | 12/1989 | Fought et al. | 280/304.1 |
| 4,987,978 | 1/1991 | Jungersen | 188/2 |
| 5,174,418 | 12/1992 | Le et al. | 188/2 |
| 5,346,039 | 9/1994 | Pfisterer | 188/2 |
| 5,355,977 | 10/1994 | Küschall | 188/2 |
| 5,472,066 | 12/1995 | Schillo et al. | 188/2 |

Primary Examiner—Robert J. Oberleitner
Assistant Examiner—Robert A. Siconolfi
Attorney, Agent, or Firm—Dennis G. LaPointe; Mason & Associates, PA

[57] ABSTRACT

A wheelchair brake comprising an activation lever, including a handle, the activation lever having a pivot, a pawl with pivot means at one end and a trapezoidal-shaped raised portion near its second end, a brake support housing having a notched bottom side plate, a U-shaped clamp for slidedly engaging a leaf spring at the bottom of the housing, the leaf spring having a handle at one end and a Z-shaped portion at an opposite end extending into the housing through the notch in the bottom side plate, the Z-shaped portion further including a lancing detent at an intermediate portion, and a stop, wherein the stop, the activation lever, the pawl with raised portion, the Z-shaped leaf spring portion and lancing detent are in cooperative engagement in various combinations depending on whether the wheelchair brake is in neutral position, locked position, or in on-guard position for up-incline aid and down-incline drag braking.

8 Claims, 7 Drawing Sheets

WHEELCHAIR BRAKE

BACKGROUND OF THE INVENTION

1. Field of the Invention

The invention relates to a brake for a wheelchair, which has a pawl and an activation lever pivotally mounted within a support housing attached to a frame member of the wheelchair, and a leaf spring with a lancing detent, wherein each component acts together so as to provide a neutral position, a locked position, and an on-guard position which provides drag braking for downward inclines and a reverse braking aid for up-inclines.

2. Description of Related Art

Wheelchair brakes are known in the art. However, known prior art brakes are activated by a system of rods, or toothed gears or cams, and generally do not promote easy operation on both downward and upward inclines.

Known related art includes a three position brake using toothed cams depicted in a wheelchair patent, U.S. Pat. No. 4,101,143 to Seiber, a two position brake using a shoe against the wheel depicted in U.S. Pat. No. 4,350,227 to Knoche, and a three position brake using a toothed shoe depicted in U.S. Pat. No. 4,560,033 to DeWoody et al. Other known related wheelchair brakes include U.S. Pat. No. 4,570,756 to Minnebrake et al., U.S. Pat. No. 4,589,525 to Phipps et al., U.S. Pat. No. 4,691,933 to Strauss, U.S. Pat. No. 4,887,830 to Fought et al., U.S. Pat. No. 4,987,978 to Jungerson, U.S. Pat. No. 5,174,418 to Le et al., and U.S. Pat. No. 5,472,066 to Schello et al.

None of the devices in the above references solve the problem of providing an easy to operate brake which takes advantage of the long moment arm of the wheel in cooperative engagement with the short moment arm of a pawl to provide not only the normal neutral and locked position but to aid in braking in inclines, up and down. An object of this novel improvement to wheelchair brakes would provide a brake wherein gravity applied to the activation lever which engages the pawl can provide braking assistance for uphill and downhill modes of operation. Another object of the invention is to provide a brake which is simple and easy to operate and does not contain toothed cams which can break. A further object of the present invention is to provide a brake which prevents warping of the wheelchair framework by the application of equal and limited force.

SUMMARY OF THE INVENTION

The present invention is a wheelchair brake adapted to provide easy and simplified operation on inclines, such as ramps and sidewalks along streets.

The principal object of the invention is to provide a device which includes a brake support housing attached to a frame member of a wheelchair, a pivotally mounted activation lever, a pivotally mounted pawl, a slidedly engageable leaf spring with a lancing detent at one end, and a stop, wherein the components act cooperatively to place the brake in neutral or to lock the brake. In addition, with the natural force of gravity on the activation lever, the brake operates to provide braking assistance on inclines without the need for the operator to exert undue force on the activation lever.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Referring now to the drawings, in particular FIGS. 1–8, the invention which is a wheelchair brake is depicted generally as 10, and comprises an elongated flat activation lever 12 having a first end and a second end, the activation lever 12 having an upward directed bend at a pre-determined intermediate position from which the second end extends to form a handle 66. The activation lever 12 further includes pivot means 20 integral with the activation lever 12, the pivot means 20 being located at a pre-determined space apart relationship between the first end of the activation lever 12 and the bend in the activation lever 12. The brake 10 further includes a pawl 30, the pawl 30 having pivot means 32 at a first end and a trapezoidal-shaped raised portion 36 juxtaposed an opposite second end of said pawl 30, the trapezoidal-shaped raised portion 36 being engagable with the first end of the activation lever 12.

The pawl 30 and the activation lever 12 is further pivotally mounted between matching trapezoidal-shaped first and second vertical side plates 58 of a brake support housing 22. The brake support housing further includes an integral top side plate 24, the first and second trapezoidal-shaped vertical side plates 58, an integral bottom side plate 26, a vertical first open end through which the activation lever 12 extends upward to form the handle 66, a second open end opposite the first open end, the second open end being adjacent to a wheelchair tire 50, and a bottom edge of each trapezoidal-shaped vertical side plate 58 being shorter than the top edge of each trapezoidal-shaped vertical side plate 58 thereby forming the trapezoidal-shape. The bottom side plate 26 is further notched at the second open end side.

The brake support housing 22 includes a limiting travel stop 60 juxtaposed the top side plate 24 and the second open end side of the housing 22, said stop 60 being engagable with the second end of said pawl 30. The brake support housing 22 further includes means 54 for attaching the housing to a frame member 56 of the wheelchair at a position along the frame member 56 so that the second open end side of the housing 22 is adjacent the tire 50. A leaf spring 28 is slidedly attached to the bottom side plate 26 of the housing 22, the leaf spring 28 further including a handle 46 at a first end located below the vertical first open end of the housing 22 and a Z-shaped portion 42 at an opposite second end, the Z-shaped portion 42 extending into the housing 22 through the notch in the bottom side plate 26 of the housing 22. The Z-shaped portion 42 further includes a lancing detent 44 at an intermediate portion of said Z-shaped portion 42, the lancing detent 44 being directed toward the bottom side plate 26 of the housing 22.

Figure 1:
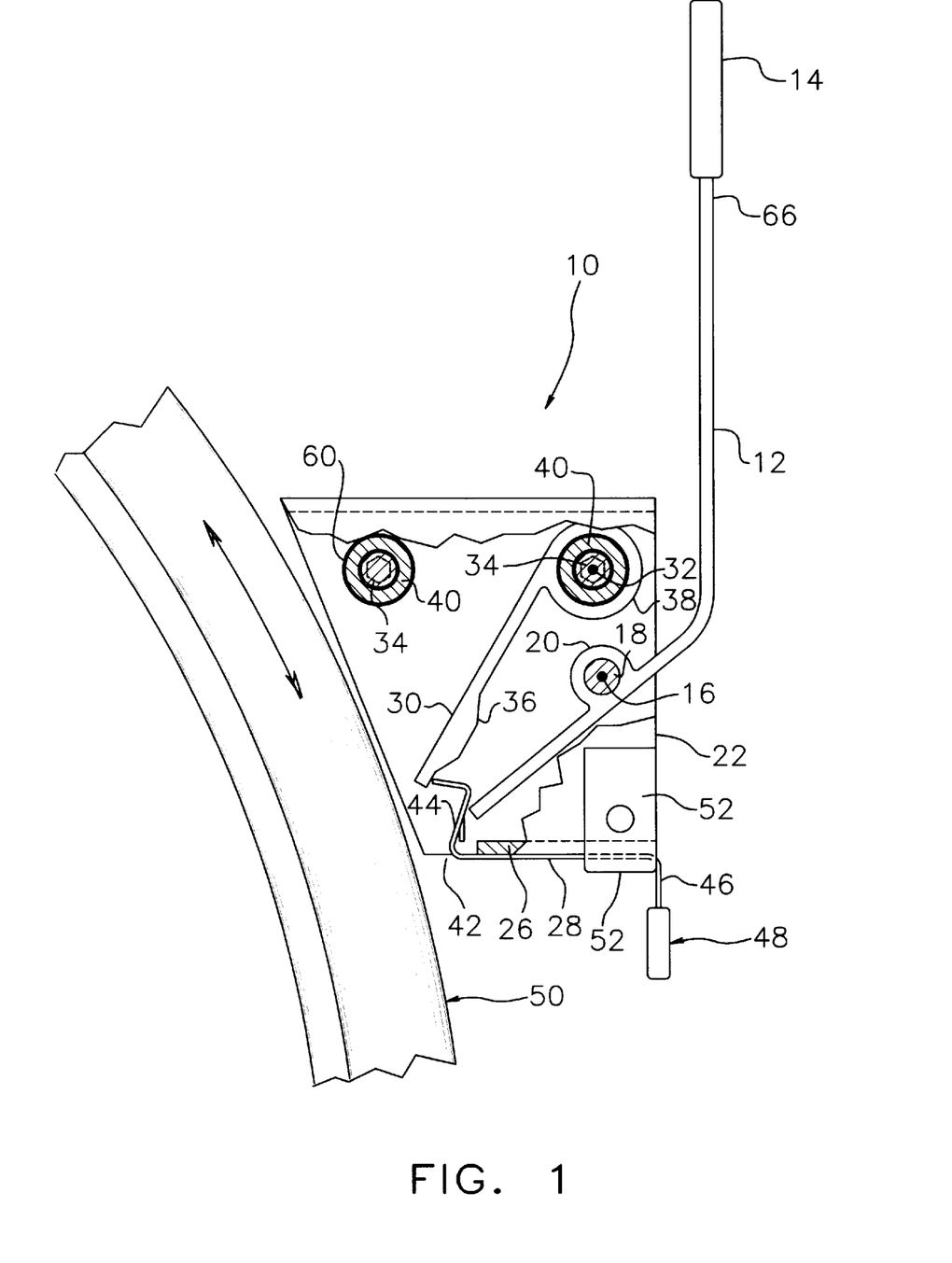
FIG. 1 is a perspective cross-sectional view of the brake locked in a neutral position.

As depicted in FIG. 1, when the wheelchair brake 10 is in the neutral position, the leaf spring handle 46 is pushed in and the Z-shaped portion 42 is engaged between the activation lever 12 first end and the pawl 30 second end juxtaposed the trapezoidal-shaped raised portion 36 of said pawl 30. The tire 50 is free to rotate in any direction as depicted by the directional arrow on the tire 50.

Figure 2:
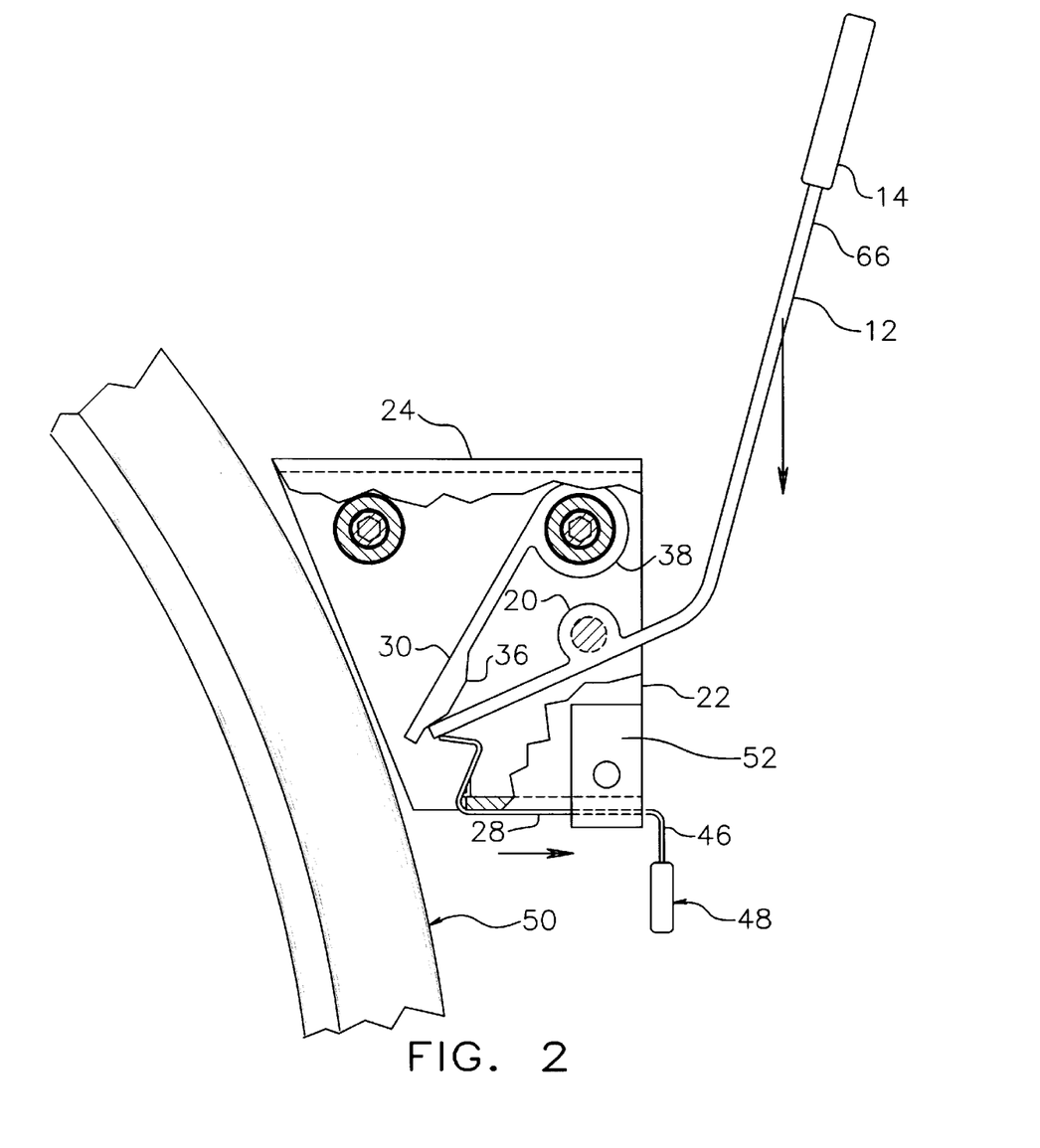
FIG. 2 is a perspective cross-sectional view of the brake in an "on-guard" position.

As depicted in FIG. 2, when the wheelchair brake 10 is in a version of the on-guard position, the leaf spring handle 46 is pulled out, engaging the lancing detent 44 on the top surface of the bottom side plate 26 thereby preventing the second end of the activation lever 12 from being pulled toward a vertical orientation, and the activation lever 12 first end is free from engagement with the leaf spring Z-shaped portion 42. As natural gravity forces drop activation lever handle 66 (as shown by the arrow originating from handle 66 in a downward direction), the 33 activation lever 12 first end is engaged with the second end of said pawl 30 so as to engage the second end of said pawl 30 with the tire 50. This on-guard position enables the operator to benefit from gravity force on the activation lever 12 to in turn provide full-time braking when in an uphill incline.

Figure 3:
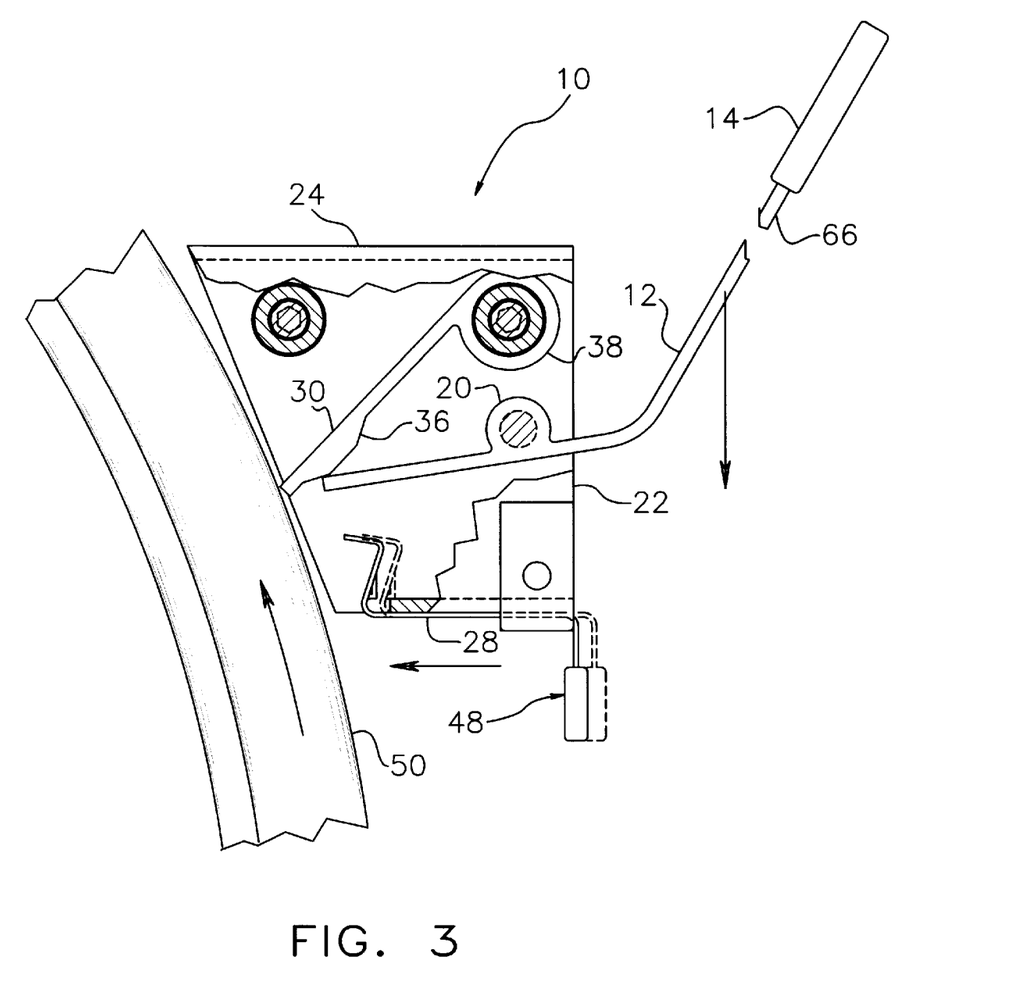
FIG. 3 is a perspective cross-sectional view of the brake in an "on-guard" position depicting the pawl being grabbed by the tire as the tire rotates in the reverse direction.

As depicted in FIG. 3, when the wheelchair brake 10 is in another version of the on-guard position, the leaf spring handle 46 is pushed in and the activation lever 12 first end is free from engagement with the leaf spring Z-shaped portion 42. As natural gravity forces drop activation lever handle 66 (as shown by the arrow originating from handle 66 in a downward direction), the activation lever 12 first end is engaged with the second end of said pawl 30 so as to engage the second end of said pawl 30 with the tire 50. This on-guard position enables the operator to benefit from gravity force on the activation lever 12 to in turn provide braking when in an uphill incline or drag braking when in a downhill incline.

Figure 5:
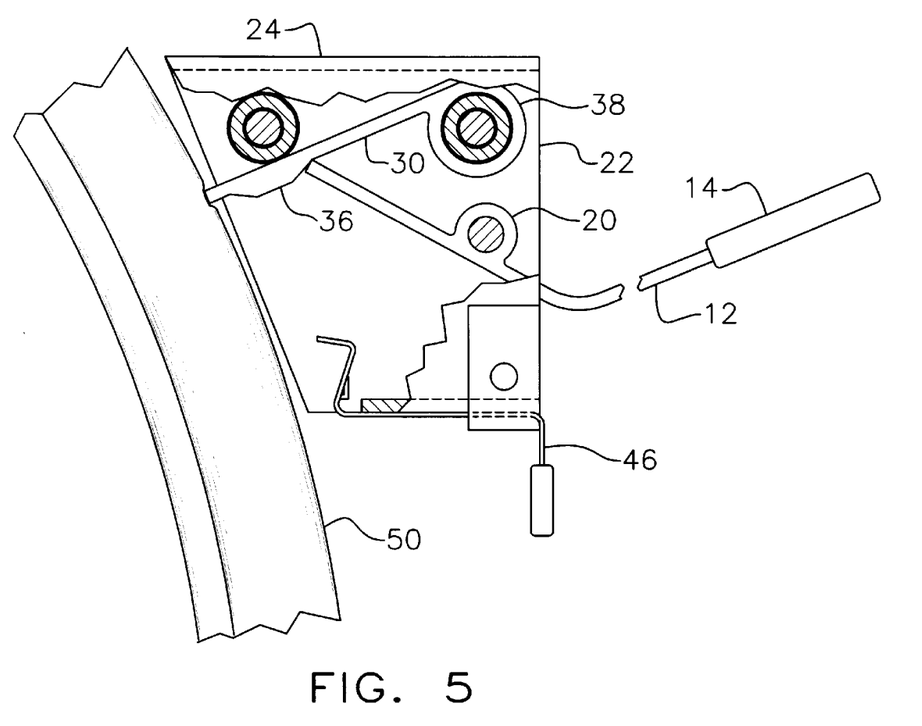
FIG. 5 is a perspective cross-sectional view of the brake depicting the brake in a locked position.

As depicted in FIG. 5, when the wheelchair brake 10 is in a locked position, the activation lever 12 second end is pushed down such that the activation lever 12 first end engages the trapezoidal-shaped raised portion 36 of the pawl 30 which in turn engages the stop 60, the second end of the pawl 30 being in compression with the tire 50.

Figure 6:
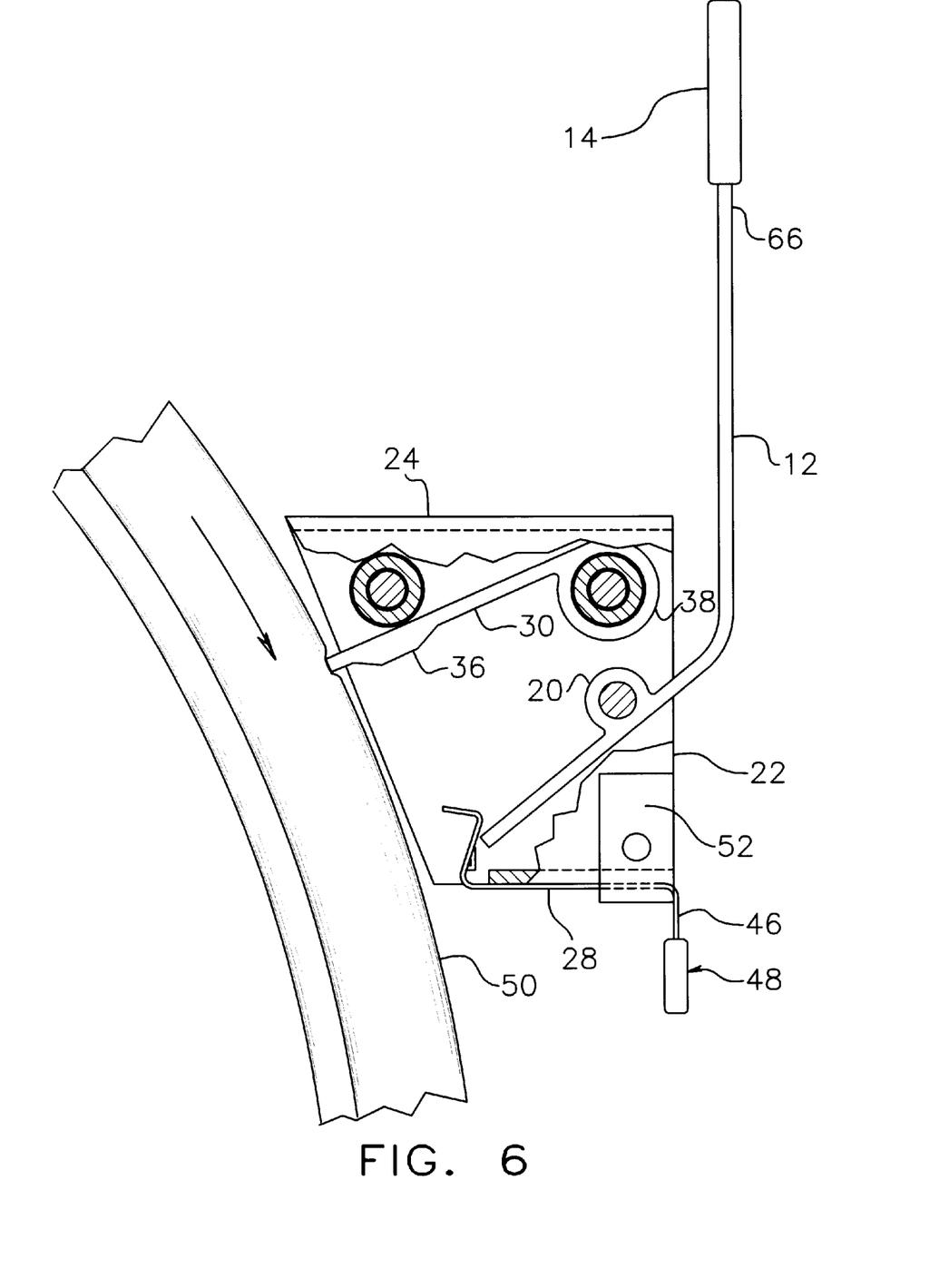
FIG. 6 is a perspective cross-sectional view of the brake depicting the pawl engaged in a tire and the brake activation lever in a neutral position.

FIG. 6 is another depiction of the brake 10 in a neutral position wherein the pawl 30 second end is engaged with the tire 50. When the tire begins forward rotation as shown by the arrow on the tire 50, the pawl 30 is released from engagement with the tire 50 and the tire 50 is free to rotate.

Figure 4:
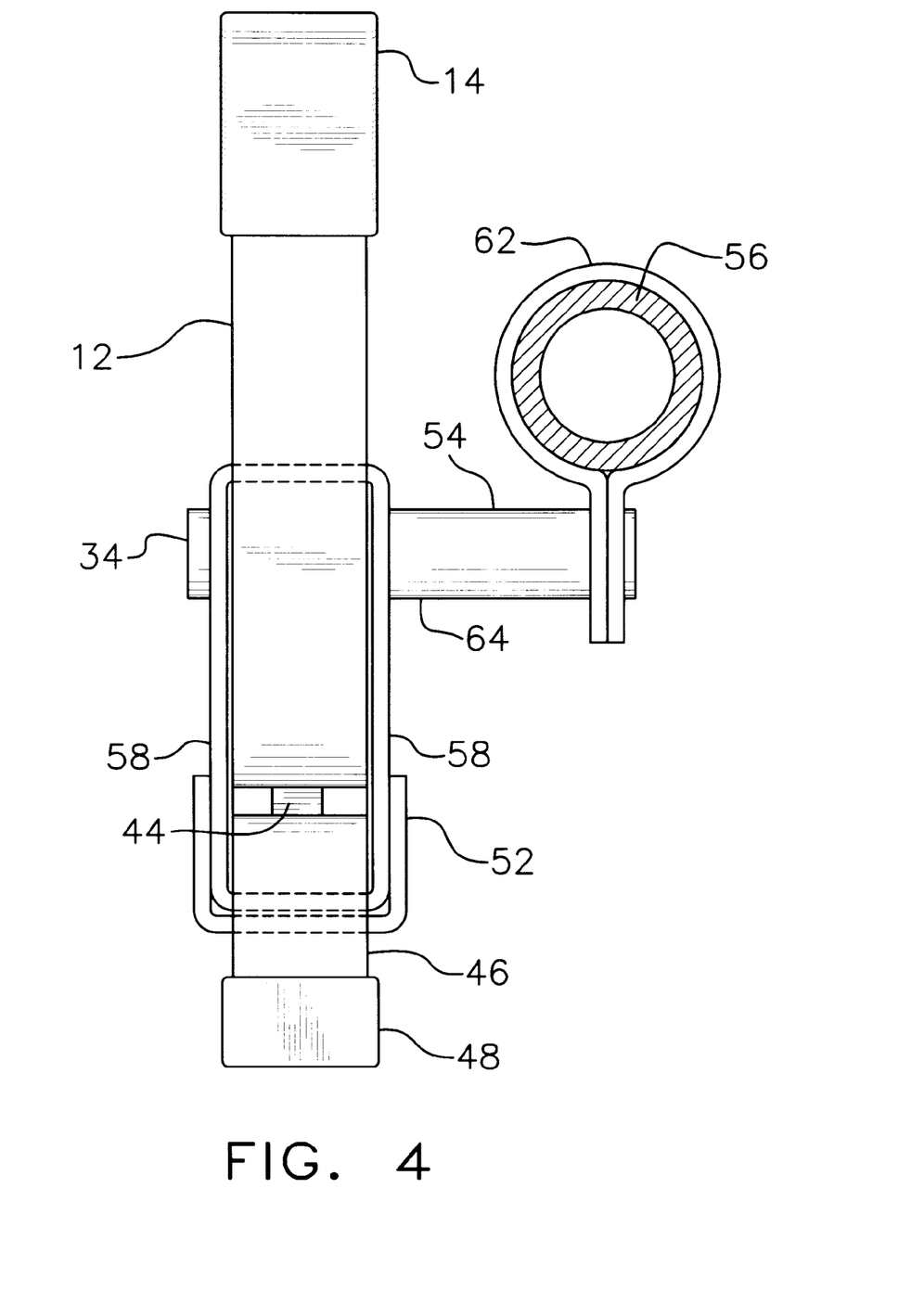
FIG. 4 is a perspective front elevational view of the brake depicting the attachment means to a wheelchair frame.
Figures 7, 8:
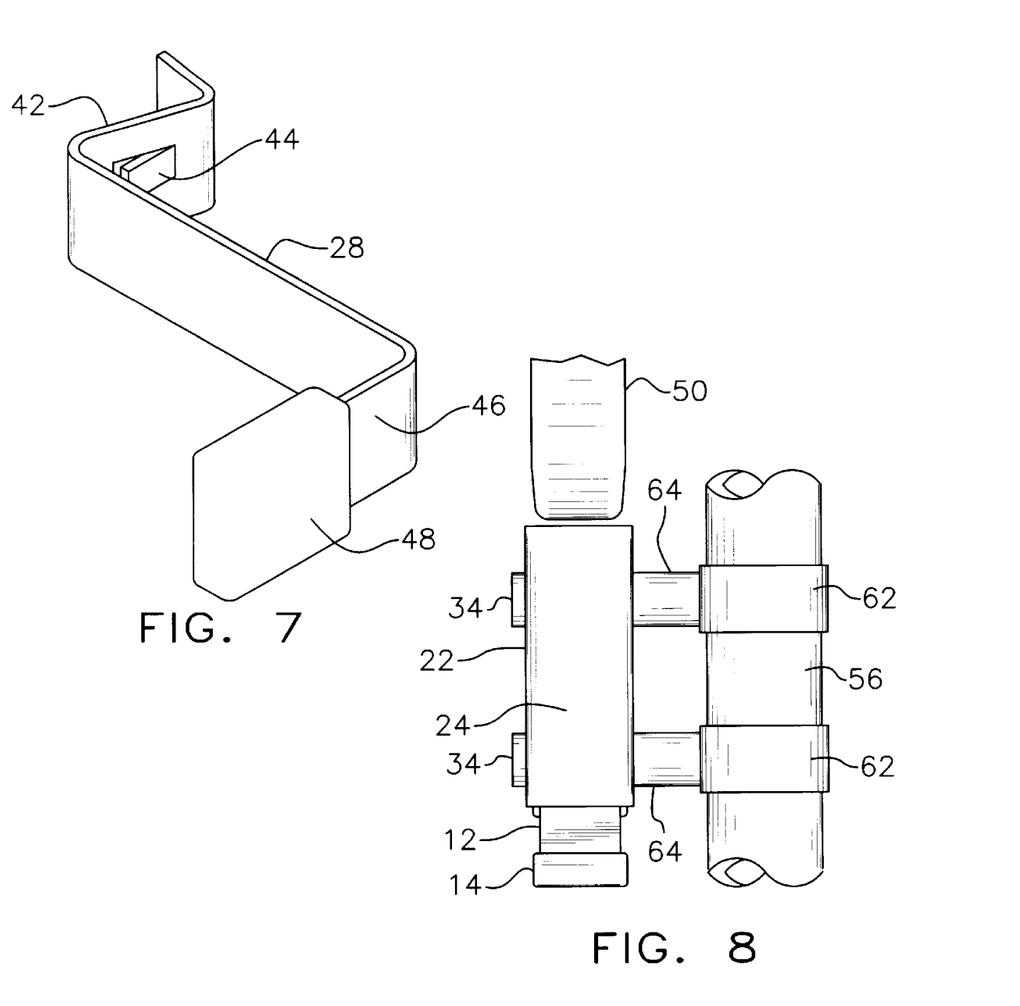
FIG. 7 is a perspective view of the leaf spring with the lancing detent.
FIG. 8 is a perspective plan view of the wheelchair brake depicting the means to attached the brake to a wheelchair frame member.

Referring to FIGS. 1, 4 and 8, the wheelchair brake 10 includes means 54 for attaching the housing to a frame member 56 of the wheelchair. The means 54 comprises a mounting bracket 62 adapted to be secured to the frame member 56 of the wheelchair, a first spacer sleeve 64 placed over the bolt 34 extending from the first trapezoidal-shaped vertical side plate 58 of the brake support housing 22, through the pawl 30 annular-shaped portion 38 including tubular sleeve 40, and out the second trapezoidal-shaped vertical side plate 58. The means 54 further comprises a second spacer sleeve 64 placed over the bolt 34 extending from the first trapezoidal-shaped vertical side plate 58 of the brake support housing 22, through the tubular sleeve 40 of the limiting travel stop 60, and out the second trapezoidal-shaped vertical side plate 58. The bolts 34 are fastened to the mounting bracket 62 adapted to be secured to the frame member 56 of the wheelchair.

As generally depicted in FIGS. 1–6, the brake support housing 22 further comprises a U-shaped clamp 52 for slidedly attaching the leaf spring 28 to the bottom side plate 26 of the housing 22, the clamp being secured to the trapezoidal-shaped vertical side plates 58 of the housing 22. The brake 10 further includes a lancing detent 44 at an intermediate portion of the Z-shaped second end 42 of the leaf spring 28. As depicted in FIG. 7, the lancing detent 44 comprises a pierced segment of the intermediate portion of the Z-shaped second end 42 of the leaf spring 28.

The pawl 30 pivot means 32 comprises an annular-shaped portion 38 at the pawl 30 first end, a bolt 34 extending from an outside surface of the first trapezoidal-shaped vertical side plate 58 through the annular-shaped portion at the pawl 30 first end and extending through the second trapezoidal-shaped vertical side plate 58 to the means 54 for attaching the housing to a frame member 56 of the wheelchair. A tubular sleeve 40 within which the bolt 34 is inserted and over which the annular-shaped portion of the pawl 30 is inserted, extends between the trapezoidal-shaped vertical side plates 58 of the brake support housing 22.

The limiting travel stop 60 comprises a bolt 34 extending from an outside surface of the first trapezoidal-shaped vertical side plate 58 juxtaposed the top plate 24 and the second open end of the housing 22 and extending within the housing 22 and through the second trapezoidal-shaped vertical side plate 58 to the means 54 for attaching the housing to a frame member 56 of the wheelchair. A tubular sleeve 40 within which the bolt 34 is inserted extends between the trapezoidal-shaped vertical side plates 58 of the brake support housing 22.

The pivot means 16 for the activation lever 12 is located at a pre-determined space apart relationship between the first end of the activation lever 12 and the bend in the activation lever 12. The pivot means 16 comprises an annular-shaped portion integral to the activation lever 12, and a clevis pin 18 within said annular-shaped portion, the clevis pin 18 being attached to each of the trapezoidal-shaped vertical side plates 58.

The activation lever 12 and the leaf spring handle 46 further include plastic covers 14 and 48 respectively for comfort to an operator's hand. As depicted in FIGS. 1–6, the leaf spring handle 46 is oriented in a downward direction. However, the leaf spring handle 46 need not be so oriented. For example, it may be oriented horizontally as long as a detent means is provided with the handle to limit its travel, such as adapting the handle to be wider than the opening between the U-shaped clamp 52 and the bottom side plate 26 of the housing 22.

As seen from the foregoing description, the present invention satisfies a long felt need to provide an easy to operate improved brake apparatus for a wheelchair which is safe for operation on inclines.

The wheelchair brake can also be adapted by one skilled in the art to a wheelchair for operation with a disabled person's foot.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A wheelchair brake comprising:

an elongated flat activation lever having a first end and a second end, the activation lever having an upward directed bend at a pre-determined intermediate position from which the second end extends to form a handle;

the activation lever further including pivot means integral with the activation lever, the pivot means being located at a pre-determined space apart relationship between the first end of the activation lever and the bend in the activation lever;

a pawl, the pawl having pivot means at a first end and a trapezoidal-shaped raised portion juxtaposed an opposite second end of said pawl, the trapezoidal-shaped raised portion being engagable with the first end of the activation lever;

the pawl and the activation lever further being pivotally mounted between matching trapezoidal-shaped first and second vertical side plates of a brake support housing;

the brake support housing further including an integral top side plate, the first and second trapezoidal-shaped vertical side plates, an integral bottom side plate, a vertical first open end through which the activation lever extends upward to form the handle, a second open end opposite the first open end, the second open end being adjacent to a wheelchair tire, a bottom edge of each trapezoidal-shaped vertical side plate being shorter than the top edge of each trapezoidal-shaped vertical side plate thereby forming the trapezoidal-shape, and the bottom side plate further being notched at the second open end side;

the brake support housing further including a limiting travel stop juxtaposed the top plate and the second open end side of the housing, said stop being engagable with the second end of said pawl;

the brake support housing further including means for attaching the housing to a frame member of the wheelchair at a position along the frame member so that the second open end side of the housing is adjacent the tire;

a leaf spring, the leaf spring being slidedly attached to the bottom side plate of the housing, the leaf spring further including a handle at a first end located below the vertical first open end of the housing and a Z-shaped portion at an opposite second end, the Z-shaped portion extending into the housing through the notch in the bottom side plate of the housing; and the Z-shaped portion further including a lancing detent at an intermediate portion of said Z-shaped portion, the lancing detent directed toward the bottom side plate of the housing, wherein when the wheelchair brake is in the neutral position, the leaf spring handle is pushed in and the Z-shaped portion is engaged between the activation lever first end and the pawl second end juxtaposed the trapezoidal-shaped raised portion of said pawl, wherein when the wheelchair brake is in the on-guard position, the leaf spring handle is pushed in and the activation lever first end is free from engagement with the leaf spring Z-shaped portion and engaged with the second end of said pawl so as to engage the second end of said pawl with the tire, wherein when the wheelchair brake is in a locked position, the activation lever second end is pushed down such that the activation lever first end engages the trapezoidal-shaped raised portion of the pawl which in turn engages the stop, the second end of the pawl being in compression with the tire, and wherein when the leaf spring handle is pulled forward away from the housing, the lancing detent engages a top surface of the bottom side plate thereby preventing the second end of the activation lever from being pulled toward a vertical orientation and thereby allowing the pawl second end to drag against the tire.

2. A wheelchair brake according to claim 1, wherein the brake support housing further comprises a U-shaped clamp for slidedly attaching the leaf spring to the bottom side plate of the housing, the clamp being secured to the trapezoidal-shaped vertical side plates of the housing.

3. A wheelchair brake according to claim 1, wherein the lancing detent at an intermediate portion of the Z-shaped second end of the leaf spring comprises a pierced segment of the intermediate portion of the Z-shaped second end of the leaf spring.

4. A wheelchair brake according to claim 1, wherein the pawl pivot means comprises:

an annular-shaped portion at the pawl first end;

a bolt extending from an outside surface of the first trapezoidal-shaped vertical side plate through the annular-shaped portion at the pawl first end and extending through the second trapezoidal-shaped vertical side plate to the means for attaching the housing to a frame member of the wheelchair; and a tubular sleeve within which the bolt is inserted and over which the annular-shaped portion is inserted, the sleeve extending between the trapezoidal-shaped vertical side plates of the brake support housing.

5. A wheelchair brake according to claim 4, wherein the limiting travel stop comprises:

a bolt extending from an outside surface of the first trapezoidal-shaped vertical side plate juxtaposed the top plate and the second open end of the housing and extending within the housing and through the second trapezoidal-shaped vertical side plate to the means for attaching the housing to a frame member of the wheelchair; and a tubular sleeve within which the bolt is inserted, the sleeve extending between the trapezoidal-shaped vertical side plates of the brake support housing.

6. A wheelchair brake according to claim 1, wherein the pivot means being located at a pre-determined space apart relationship between the first end of the activation lever and the bend in the activation lever comprises:

an annular-shaped portion integral to the activation lever; and a clevis pin within said annular-shaped portion, the clevis pin being attached to each of the trapezoidal-shaped vertical side plates.

7. A wheelchair brake according to claim 5, wherein the means for attaching the housing to a frame member of the wheelchair comprises:

a mounting bracket adapted to be secured to the frame member of the wheelchair;

a first spacer sleeve placed over the bolt extending from the first trapezoidal-shaped vertical side plate of the brake support housing, through the pawl annular-shaped portion including the tubular sleeve, and out the second trapezoidal-shaped vertical side plate; and a second spacer sleeve placed over the bolt extending from the first trapezoidal-shaped vertical side plate of the brake support housing, through the tubular sleeve of the limiting travel stop, and out the second trapezoidal-shaped vertical side plate, wherein the bolts are fastened to the mounting bracket adapted to be secured to the frame member of the wheelchair.

8. A wheelchair brake according to claim 1, wherein the activation lever handle and the leaf spring handle are each covered with a plastic cover.

* * * * *

UNITED STATES PATENT AND TRADEMARK OFFICE
CERTIFICATE OF CORRECTION

PATENT NO : 6,102,166
DATED : August 15, 2000
INVENTOR(S) : Leif Blodee

It is certified that error appears in the above-identified patent and that said Letters Patent are hereby corrected as shown below:

Col. 3, line 28
replace "the 33 activation"
with --the activation--.

Signed and Sealed this

Seventeenth Day of April, 2001

Attest:

NICHOLAS P. GODICI

Attesting Officer

Acting Director of the United States Patent and Trademark Office